US011222258B2

(12) United States Patent
Nagarajan et al.

(10) Patent No.: US 11,222,258 B2
(45) Date of Patent: Jan. 11, 2022

(54) LOAD BALANCING FOR MEMORY CHANNEL CONTROLLERS

(71) Applicant: Google LLC, Mountain View, CA (US)

(72) Inventors: Rahul Nagarajan, Sunnyvale, CA (US); Hema Hariharan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/865,539

(22) Filed: May 4, 2020

(65) Prior Publication Data

US 2021/0303978 A1    Sep. 30, 2021

Related U.S. Application Data

(60) Provisional application No. 63/001,216, filed on Mar. 27, 2020.

(51) Int. Cl.
*G06N 3/063* (2006.01)
*G06N 3/08* (2006.01)
(Continued)

(52) U.S. Cl.
CPC .............. *G06N 3/063* (2013.01); *G06F 3/061* (2013.01); *G06N 3/04* (2013.01); *G06N 3/08* (2013.01)

(58) Field of Classification Search
CPC ...................................................... G06N 3/063
(Continued)

(56) References Cited

U.S. PATENT DOCUMENTS 5,226,092 A * 7/1993 Chen ...................... G06N 3/063
 382/157
6,601,126 B1 * 7/2003 Zaidi ................... G06F 15/7832
 710/305

(Continued)

FOREIGN PATENT DOCUMENTS

EP          1439467          7/2004

OTHER PUBLICATIONS

B. Karaoglu and W. Heinzelman, "Cooperative Load Balancing and Dynamic Channel Allocation for Cluster-Based Mobile Ad Hoc Networks," in IEEE Transactions on Mobile Computing, vol. 14, No. 5, pp. 951-963, May 1, 2015, doi: 10.1109/TMC.2014.2339215. (Year: 2015).*

(Continued)

*Primary Examiner* — James D. Rutten
(74) *Attorney, Agent, or Firm* — Fish & Richardson P.C.

(57) ABSTRACT

Methods, systems, and apparatus, including computer-readable media, are described for performing neural network computations using a system configured to implement a neural network on a hardware circuit. The system includes a process ID unit that receives requests to obtain data from a memory that includes memory locations that are each identified by an address. For each request, the process ID unit selects a channel controller to receive the request, provides the request to be processed by the selected channel controller, and obtains the data from memory in response to processing the request using the selected channel controller. The channel controller is one of multiple channel controllers that are configured to access any memory location of the memory. The system performs the neural network computations using the data obtained from memory and resources allocated from a shared memory of the hardware circuit.

27 Claims, 8 Drawing Sheets

(51) Int. Cl.
  *G06N 3/04* (2006.01)
  *G06F 3/06* (2006.01)
(58) Field of Classification Search
  USPC .......................................................... 706/41
  See application file for complete search history.

(56) References Cited

U.S. PATENT DOCUMENTS

| | | | | |
|---|---|---|---|---|
| 7,058,761 | B2* | 6/2006 | Nakamura | G06F 3/0613 |
| | | | | 707/999.1 |
| 8,310,854 | B2 | 11/2012 | MacWilliams et al. | |
| 8,850,091 | B1* | 9/2014 | Karamcheti | G06F 12/0246 |
| | | | | 710/62 |
| 9,405,700 | B2 | 8/2016 | Wingard | |
| 9,465,735 | B2 | 10/2016 | Rychlik et al. | |
| 10,062,422 | B2 | 8/2018 | Wingard et al. | |
| 10,552,055 | B2 | 2/2020 | Liu et al. | |
| 2003/0018741 | A1* | 1/2003 | Mizuno | G06F 3/0635 |
| | | | | 709/214 |
| 2006/0294328 | A1 | 12/2006 | Akiyama et al. | |
| 2007/0073994 | A1* | 3/2007 | Zohar | G06F 3/067 |
| | | | | 711/173 |
| 2014/0250262 | A1* | 9/2014 | Buxton | G11C 14/009 |
| | | | | 711/103 |
| 2014/0279774 | A1* | 9/2014 | Wang | G06N 7/005 |
| | | | | 706/20 |
| 2014/0365726 | A1* | 12/2014 | Bennett | G06F 3/0659 |
| | | | | 711/114 |
| 2016/0071608 | A1 | 3/2016 | Bronner et al. | |
| 2016/0188423 | A1 | 6/2016 | Meaney et al. | |
| 2016/0315866 | A1* | 10/2016 | Thapar | H04L 47/2408 |
| 2016/0321074 | A1* | 11/2016 | Hung | G06F 9/30072 |
| 2016/0342895 | A1* | 11/2016 | Gao | G06N 3/0445 |
| 2018/0189638 | A1* | 7/2018 | Nurvitadhi | G06N 3/0445 |
| 2019/0265889 | A1 | 8/2019 | Asnaashari et al. | |
| 2020/0151837 | A1* | 5/2020 | Russell | G06N 3/0445 |
| 2020/0193141 | A1* | 6/2020 | Tan | G06K 9/00771 |

OTHER PUBLICATIONS

M. Song, H. Li and H. Wu, "A Decentralized Load Balancing Architecture for Cache System," 2015 International Conference on Cyber-Enabled Distributed Computing and Knowledge Discovery, 2015, pp. 114-119, doi: 10.1109/CyberC.2015.44. (Year: 2015).*
G. Liu and X. Wang, "A Modified Round-Robin Load Balancing Algorithm Based on Content of Request," 2018 5th International Conference on Information Science and Control Engineering (ICISCE), 2018, pp. 66-72, doi: 10.1109/ICISCE.2018.00023. (Year: 2018).*
PCT International Search Report and Written Opinion in International Application No. PCT/US2021/014376, dated May 12, 2021, 13 pages.

* cited by examiner

```
rr_channels = []
start_channel = 0
increment = 1 for i in range (2048):
    for j in range (16):
        rr_channels.append ((start_channel + j) % 16)
    start_channel = (start_channel + increment) % 16
```

Fig. 4

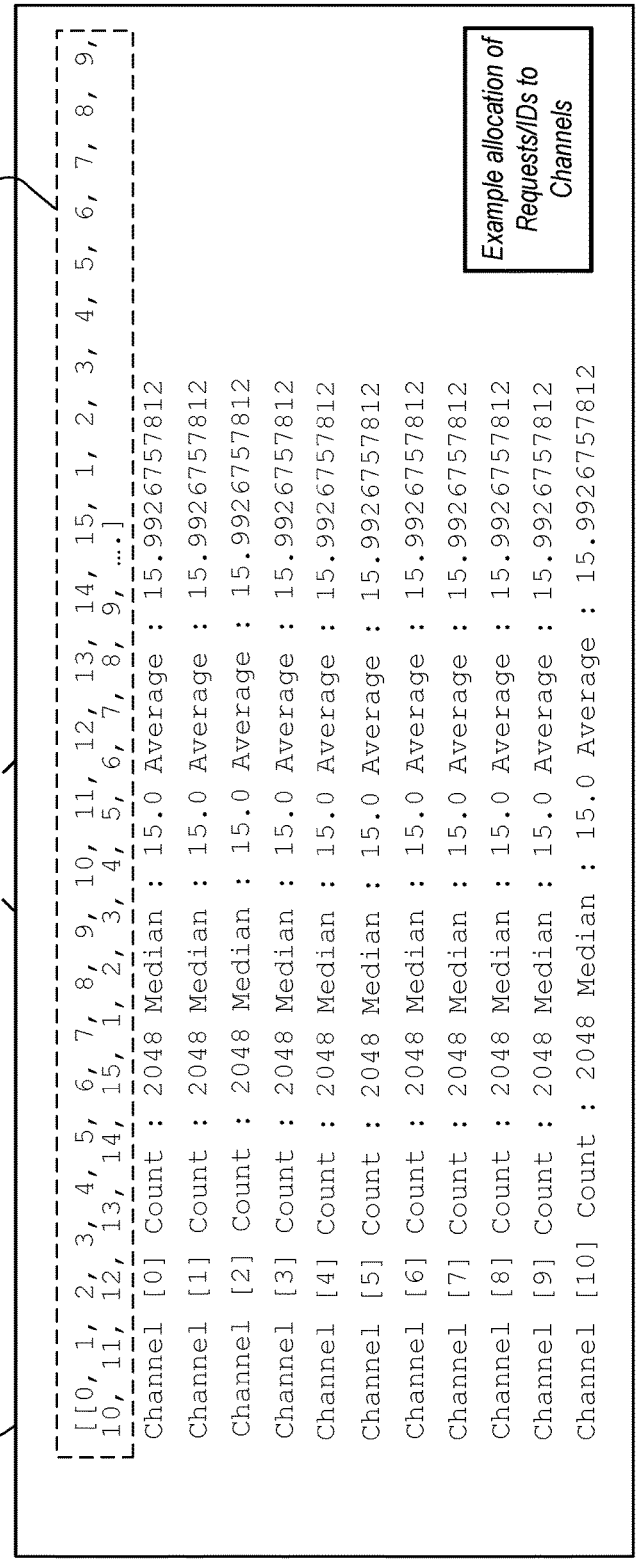

[[0, 1, 2, 3, 4, 5, 6, 7, 8, 9, 10, 11, 12, 13, 14, 15, 1, 2, 3, 4, 5, 6, 7, 8, 9, 10, 11, 12, 13, 14, 15, 1, 2, 3, 4, 5, 6, 7, 8, 9, .....]

Channel [0] Count : 2048 Median : 15.0 Average : 15.9926757812
Channel [1] Count : 2048 Median : 15.0 Average : 15.9926757812
Channel [2] Count : 2048 Median : 15.0 Average : 15.9926757812
Channel [3] Count : 2048 Median : 15.0 Average : 15.9926757812
Channel [4] Count : 2048 Median : 15.0 Average : 15.9926757812
Channel [5] Count : 2048 Median : 15.0 Average : 15.9926757812
Channel [6] Count : 2048 Median : 15.0 Average : 15.9926757812
Channel [7] Count : 2048 Median : 15.0 Average : 15.9926757812
Channel [8] Count : 2048 Median : 15.0 Average : 15.9926757812
Channel [9] Count : 2048 Median : 15.0 Average : 15.9926757812
Channel [10] Count : 2048 Median : 15.0 Average : 15.9926757812

*Example allocation of Requests/IDs to Channels*

LOAD BALANCING FOR MEMORY CHANNEL CONTROLLERS

CROSS-REFERENCE TO RELATED APPLICATION

This application claims the benefit of U.S. Provisional Application No. 63/001,216, filed Mar. 27, 2020. The contents of which are incorporated by reference herein.

BACKGROUND

This specification generally relates to using circuitry to perform neural network computations.

Neural networks are machine-learning models that employ one or more layers of nodes to generate an output, e.g., a classification, for a received input. Some neural networks include one or more hidden layers in addition to an output layer. The output of each hidden layer is used as input to one or more other layers in the network, e.g., other hidden layers or the output layer of the network. Some of the layers of the network generate an output from a received input in accordance with current values of a respective set of parameters.

Some neural networks are convolutional neural networks (CNNs) (e.g., for image processing) or recurrent neural networks (RNNs) (e.g., for speech and language processing). Each of these neural networks include respective sets of convolutional or recurrent neural network layers. A neural network layer can have an associated set of kernels as well as an embedding layer for processing inputs to generate sets of vectors for training a neural network. Kernels can be represented as a tensor, i.e., a multi-dimensional array, of weights. As an example, embedding layers can process a set of inputs, such as inputs of image pixel data or activation values generated by a neural network layer. The set of inputs or set of activation values can also be represented as a tensor.

SUMMARY

This document describes techniques for balancing processing loads experienced by channel controllers in a distributed processing system. The techniques can be used in an example computing system, such as a large-scale distributed system or other systems that process data. The techniques make use of circuitry configured to distribute requests to channel controllers that process the requests to retrieve data stored at different memory locations of the distributed system. A channel controller that receives a request is one of multiple channel controllers that are included in the distributed system. Each channel controller is configured to access any memory location of an example high-bandwidth memory in the distributed system.

The retrieved data can represent inputs to a neural network layer. Each of the requests is distributed with reference to a channel controller that is selected to process the request. The requests to retrieve the inputs are distributed to the channel controllers for processing in a manner that reduces or eliminates load imbalances across the channel controllers. In this example the retrieved data is processed to perform neural network computations. In some instances the data is processed as a step in accelerating computations of an embedding layer of an artificial neural network.

One aspect of the subject matter described in this specification can be embodied in a method for performing neural network computations using a system configured to implement a neural network on a hardware circuit. The method includes receiving requests to obtain data from a memory including multiple memory locations, each memory location being identified by a respective address. For each request to obtain the data from the memory, the method includes: selecting a channel controller to receive the request, wherein the channel controller is one of multiple channel controllers that are each configured to access any memory location of the memory; providing the request to be processed by the channel controller selected to receive the request; and obtaining the data from memory in response to processing the request using the channel controller selected to receive the request. The method also includes performing the neural network computations using the data obtained from memory and resources allocated from a shared memory of the hardware circuit.

These and other implementations can each optionally include one or more of the following features. For example, in some implementations, selecting the channel controller to receive the request includes: selecting the channel controller based on a dispatch algorithm, the dispatch algorithm being used to distribute respective addresses of memory locations to any one of the multiple channel controllers that is selected to receive the request.

The method further includes: receiving multiple requests to obtain different inputs from the memory, each request of the multiple requests specifying an address for a memory location that stores the input; determining, based on the dispatch algorithm, an allocation of addresses corresponding to each of the multiple requests; and distributing the multiple requests to the multiple channel controllers based on the determined allocation of addresses. Determining the allocation of addresses can include: determining the allocation of addresses such that a respective quantity of addresses that is allocated and distributed to a corresponding channel controller is substantially equal among each of the multiple channel controllers.

In some implementations, the system includes a shared on-chip interconnect that is configured to allow any channel controller to access memory locations allocated to any channel of multiple channels in the memory. Each channel of the multiple channels in the memory can include a set of memory locations and the method includes: accessing, based on the on-chip interconnect, any memory location allocated to any channel using any channel controller.

Performing the neural network computations can include: determining an allocation of shared resources in the shared memory; and performing the neural network computations based on the determined allocation of shared resources. In some implementations, determining an allocation of shared resources in the shared memory includes: determining an amount of scratchpad memory to be used by the selected channel controller and a vector processing unit of the system that performs a portion of the neural network computations. In some implementations, a shared resource of the shared memory is a memory bank of the shared memory that is configured as a circular buffer of the shared memory that communicates with the vector processing unit.

The method can further include: obtaining a batch of inputs to a neural network layer in response to processing the request. The batch of inputs correspond to the data obtained from memory; and each input in the batch of inputs is used to map a set of features to a vector of numbers. In some implementations, the neural network layer is an embedding layer that is represented by a trainable lookup table that maps each feature in the set of features to a respective vector of numbers. The method can further include processing each input in the batch of inputs through the neural network layer to learn vectors of values, where the vectors of values correspond to each of the respective vector of numbers; and updating embeddings stored at the trainable lookup table for the embedding layer of the neural network based on the vector of values.

In some implementations, performing the neural network computations includes generating an embedding output of the neural network layer from the obtained batch of inputs; and updating the embeddings includes updating values of the trainable lookup table in response to back propagating gradients that are computed based on the embedding output.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages.

Circuitry for a crossbar/on-chip interconnect can be implemented at a special-purpose hardware circuit, such as a hardware accelerator used in a distributed system. The crossbar allows each channel controller to read data from, and write data to, any address location of a memory cell in any channel of a high-bandwidth memory system that communicates with a processor core or accelerator chip. This avoids the need to map channel controllers to specific memory channels, which can cause load imbalances that result in performance penalties.

The crossbar mitigates against degraded performance that can occur when a particular channel controller receives a substantially large number of addresses for processing relative to other channel controllers in a set. The crossbar is implemented to load-balance an allocation of addresses by assigning addresses to any channel controller for processing across all memory channels. Hence, the crossbar can improve performance in a distributed system relative to prior approaches.

The techniques include a dispatch algorithm that is based on a modified round-robin dispatch scheme. The dispatch algorithm allows a process control unit of the system to dispatch addresses across a set of channel controllers, where selection of each individual channel controller that receives addresses is substantially equal across the set. The dispatch algorithm is adapted to mitigate against a bursting property of the original or unmodified round-robin scheme, which can be problematic when the channel controllers configured to access any memory location are used in combination with a circular buffer of a shared scratchpad memory.

The circular buffer is used with an allocation scheme that does not depend on the size and order of data that is written to the buffer, which can result in wasteful over allocation of shared buffer space when large portions of allocated space are unused by the channel controller to which the space is assigned. To improve the efficiency and utilization of the shared buffers, the techniques can be implemented to optimize allocation of space in circular buffers of the shared scratchpad memory based at least on a latency of the memory accesses observed in an example processing pipeline of each channel controller.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 4 illustrates an example allocation of requests to different channel controllers.

Like reference numbers and designations in the various drawings indicate like elements.

DETAILED DESCRIPTION

Figure 1:
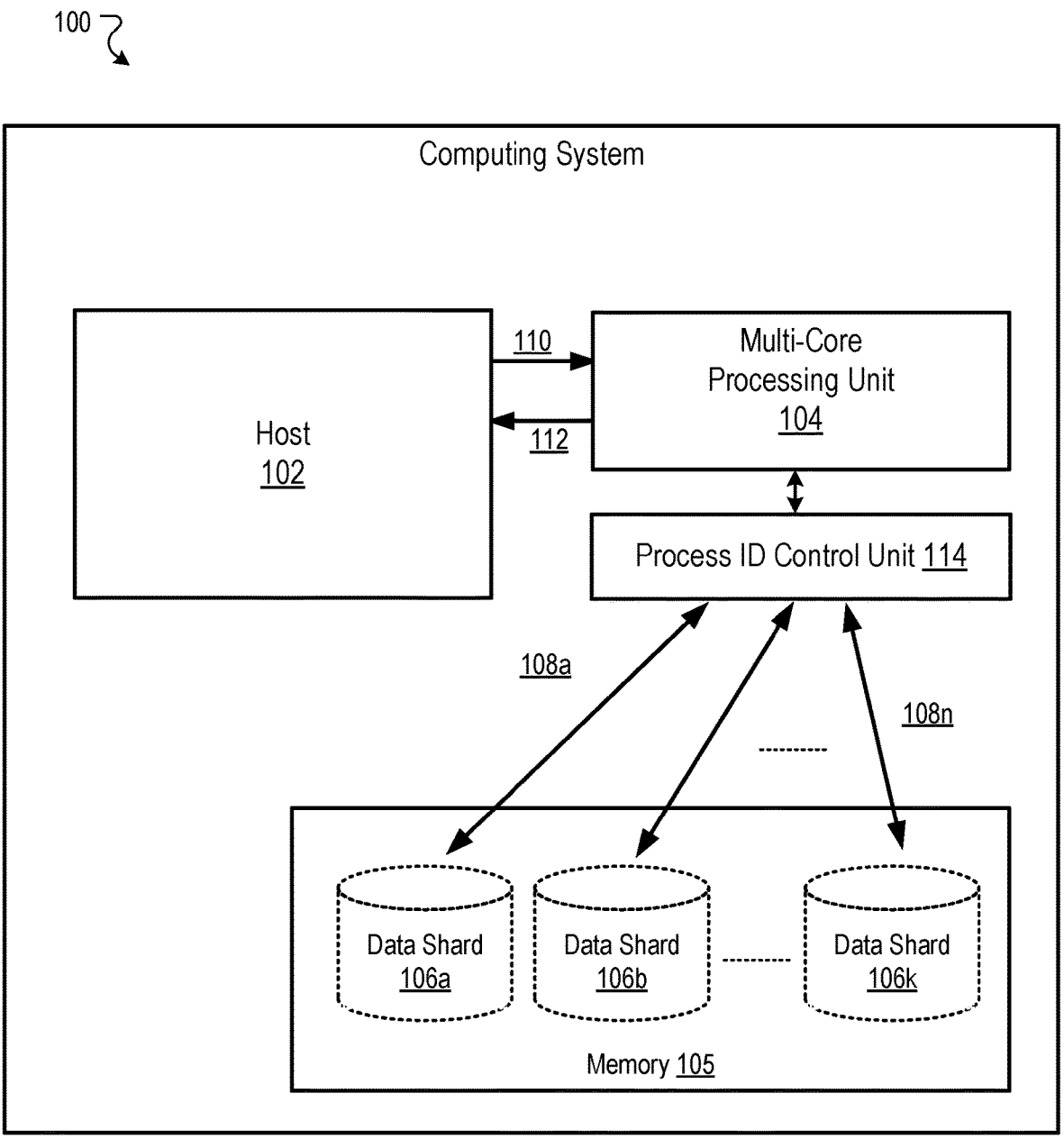
FIG. 1 is a block diagram of an example computing system.

A distributed system can include memory for storing values that are accessed and used to perform an operation or to compute a value. Each value may be stored at a respective location in the memory that is identified by an address. The memory may be arranged to include different memory channels, where each channel includes a set of memory locations that are identified by a corresponding set of addresses. A channel controller is used to control and manage accesses to specific memory locations of a given memory channel to retrieve data specified by a request. More specifically, the channel controllers use communication channels of the distributed system to manage the flow of data to and from the memory.

This specification describes techniques for balancing loads across a group of channel controllers to mitigate processing delays that can occur due to channel controller load imbalances in a distributed computing system. For example, the delays may occur during processor computations for generating an output of an embedding layer of a multi-layer neural network. Specifically, when a particular channel controller of a distributed system is required to perform a substantial number of data retrieval and compute/processing operations (e.g., reductions or concatenations of retrieved values) to perform a neural network computation, this particular channel controller can experience processing delays corresponding to a load imbalance.

The imbalance can be between a first channel controller that receives a substantial number of requests or addresses/IDs in a request relative to a second, different channel controller. The channel controller is configured to process the requests to retrieve data for a neural network computation, such as data for an input value that is to be processed through a neural network layer. In some implementations, the data represents embeddings (e.g., weights) of an embedding table and a channel controller may be tasked to process the request to return the embedding for the input value. For example, in a forward pass compute operation of an embedding layer, each channel controller processes requests that specify addresses for locations in memory, which causes the channel controller to retrieve data stored at the memory location and to perform computations using the retrieved data.

In prior distributed architectures each channel controller was mapped to a specific bank or channel in the large system memory, such that each channel controller could process only those addresses for memory locations to which the channel controller was mapped. For example, each channel controller was only able to access a particular subset of memory. So, if that subset of memory includes locations and addresses that store "hard" data (e.g., dense or large data values) or data that is accessed more frequently for a given task, then the channel controller mapped to that subset will experience an imbalance in its processing load relative to other channel controllers that are mapped to other memory subsets.

An individual channel controller can be each tasked to retrieve a portion of data required for a computation or task in a larger workload. Imbalances between individual channel controllers can cause one channel controller to require additional processing time to obtain its portion of data for the computation relative to another channel controller. Because the entire portion of data may be required for the task, the additional processing time required by one channel controller results in an overall processing delay in performing the task for the larger workload.

Relatedly, each channel controller may be allocated a portion of resources, such as a buffer, from a shared scratchpad memory space to perform certain operations using the retrieved data. Because the number of addresses (or requests) processed by each channel controller is different, the number of scratchpad memory/buffer locations used by each channel controller will also be quite different. Prior approaches to managing the allocation of shared resources across the channel controllers were limited with respect to allocating different amounts of memory across the channels. So, these prior approaches were prone to over-allocation of shared resources for a given channel, which resulted in scratchpad spaces being wasted across the channels. These approaches also caused performance penalties when otherwise useful scratchpad buffer space is allocated but remains unused by a channel controller.

Based on the context discussed above, this specification describes data processing techniques and corresponding hardware circuitry that can be implemented in a special-purpose processor to balance processing loads experienced by channel controllers in a distributed processing system. For example, a distributed system that includes a large memory unit (e.g., a high-bandwidth memory) and a special-purpose hardware circuit can generate instructions to cause any channel controller to obtain data from any memory location and for any data shard of the memory unit. More specifically, this feature is enabled based on an on-chip interconnect (or crossbar) that is integrated at the hardware circuit to allow each channel controller to read data from, and write data to, any channel of a high-bandwidth memory system. The crossbar feature removes the constraint of storing data in a manner that is sensitive to which addresses allocations are mapped to specific channel controllers and allows for simplifying how sets of data may be laid out in the memory system. The system is operable to send requests, or addresses specified in a request, to any channel controller because each channel controller is configured to obtain values from any memory location or data shard.

This specification also describes techniques for implementing a circular buffer in combination with the above method of using any channel controller to obtain data from any memory location of a system memory. The circular buffer is based on an allocation of individual resources included in a shared scratchpad memory. Implementation of the circular buffer is adapted to address load imbalance issues that arise when a system is required to process a variable number of ID headers (e.g., addresses) across a set of channel controllers. The system includes an example hardware manager that executes instructions for defining and managing the each circular buffer. Instead of allocating a fixed size amount of shared memory buffers to each channel controller, the hardware manager is operable to define a size of each buffer allocation based on an observed latency required to fully execute computes on data fetched from memory locations of the system memory.

FIG. 1 shows a block diagram of an example computing system 100 that is configured to retrieve data elements stored in a memory of system 100. The data elements can be retrieved and used to perform neural network computations for an example machine-learning workload. For example, the data elements can be processed to compute an output for a neural network layer or to perform embedding layer operations to generate sets of embeddings for training a neural network.

Embedding outputs are generated when a neural network of system 100 is trained to perform certain computational functions, such as computations related to machine translation, natural language understanding, ranking models, or content recommendation models. In some implementations, training the neural network involves updating a set of embeddings that were previously stored in an embedding table of the neural network, such as during a prior phase of training the neural network. For example, the embeddings of an embedding layer of a neural network may be trained jointly with the neural network for which the embeddings are to be used. Hence, the techniques described in this specification can be used to update embeddings during training of a neural network, with improved efficiency over prior approaches.

In general, an embedding layer of a neural network is used to embed features in a feature/embedding space corresponding to the embedding layer. An embedding vector can be a respective vector of numbers that is mapped to a corresponding feature in a set of features of a lookup table that represents an embedding layer. A feature can be an attribute or property that is shared by independent units on which analysis or prediction is to be performed. For example, the independent units can be groups of words in a vocabulary or image pixels that form parts of items such as images and other documents. An algorithm for training embeddings of an embedding layer can be executed by a neural network processor to map features to embedding vectors. In some implementations, embeddings of an embedding table are learned jointly with other layers of the neural network for which the embeddings are to be used. This type of learning occurs by back propagating gradients to update the embedding tables.

In other implementations, the embeddings may be learned separately from the other layers of the neural network for which the embeddings are to be used, such as when embeddings are pre-trained. For example, the algorithm can be used by the neural network processor to compute embeddings by processing information about discrete input features to determine a mapping or placement of similar inputs to embedding vectors that are geometrically close in the embedding space. In some cases, the process of computing embeddings can represent a technique for feature learning or feature engineering that allows a system to automatically discover representations needed for feature detection from raw input data.

In some implementations, a given "input" can have one or more features of one or more types, and the embedding layer generates a respective embedding for each of those types. For example, an input can be for a search query that has a few different feature types. The feature types can include properties of a user or user device (e.g., location, preferences, device type, etc.), query tokens, previously submitted queries, or other related types that may correspond to attributes of a search query. For any feature types that have more than one feature for a given input, a computing system is operable to retrieve the individual embeddings for each of those features. The system is also operable to combine the retrieved embeddings, e.g., by computing averages of the embedding values, to generate a final embedding for that feature type.

The computing system 100 includes a host 102, a multi-core processing unit 104, and a memory unit 105 ("memory 105"). The memory 105 includes data shards 106a-106k, where k is an integer greater than one. The memory 105 is described in more detail below. In general, the host 102 can be a processing unit, such as a processor, multiple processors, or multiple processor cores. Hence, the host 102 may include one or more processors, and is operable to generate or process an instruction for accessing a target dense matrix and to send an instruction 110 to the multi-core processing unit 104 to generate the target dense matrix. As described in more detail below, performing embedding layer operations can include transforming sparse elements from one or more matrices to generate a dense matrix.

The multi-core processing unit 104 accesses the corresponding elements 108a-108n from one or more of the data shards 106a-106k in memory 105, where n is an integer greater than one. The multi-core processing unit 104 generates the target dense matrix 112 using the corresponding elements 108a-108n, and provides the target dense matrix 112 to the host 102 for further processing. The multi-core processing unit 104 may generate the target dense matrix 112 by transforming each of the elements 108a-108n into a vector, and concatenating the n vectors into a single vector.

Generally, in the context of embeddings, 'sparse' information corresponding to the sparse elements may be a one-hot vector that identifies a feature value. For example, if there are five possible values for a given feature (e.g., A, B, C, D, E), the sparse vector would identify the feature value 'A' as (1, 0, 0, 0, 0) and the embedding layer would map (1, 0, 0, 0, 0) to a dense embedding vector for the feature value "A." In some implementations, during the training of an embedding layer to learn embeddings, the elements 108a-108n may be weight values of an embedding table that are transformed into a vector, such as an embedding vector for the feature value "B" or "C." The weight values may be transformed using a neural network processor of the multi-core processing unit 104 that executes a training algorithm to compute embeddings based at least on a mapping of features to embedding vectors.

The host 102 can process an instruction for updating a target dense matrix and sends an updated dense matrix to the multi-core processing unit 104. For example, a target dense matrix may correspond to an embedding of a neural network. Hence, the host 102 can process an instruction to update the embeddings to generate an updated dense matrix. For example, during a subsequent iteration of training a neural network to update embeddings a backward pass may be performed to update the embeddings by determining a new mapping of input features to embedding vectors and generating an updated dense matrix based on the new mapping. In some implementations, the multi-core processing unit 104 is operable to transform the updated dense matrix into corresponding sparse elements and to update one or more sparse elements (e.g., weights) stored in the data shards 106a-106k accordingly.

As indicated above, the host 102 is configured to process instructions for execution within the computing system 100. In some implementations, the host 102 is configured to process the target dense matrix 112 generated by the multi-core processing unit 104. In some other implementations, the host 102 may be configured to request the multi-core processing unit 104 to generate the target dense matrix 112, and another processing unit may be configured to process the target dense matrix 112.

Each processor of the multi-core processing unit 104 is configured to retrieve data elements stored in a memory of system 100. The memory can include multiple data shards 106a-106k that store data including elements 108a-108n. The data can include inputs, activations, gain values, or weight values corresponding to parameters or kernels of a matrix structure of weights. In some implementations, the data shards 106a-106k may be a volatile memory unit or units. In some other implementations, the data shards 106a-106k may be a non-volatile memory unit or units. The data shards 106a-106k may also be another form of computer-readable medium, such as devices in a storage area network or other configurations. The data shards 106a-106k may be coupled to the multi-core processing unit 104 using electrical connections, optical connections, or wireless connections. In some implementations, the data shards 106a-106k may be part of the multi-core processing unit 104 and based on a Processor-in-memory (PIM) architecture.

The multi-core processing unit 104 is configured to determine a dense matrix based on sparse elements. The multi-core processing unit 104 includes multiple interconnected processors or processor cores. For example, the multi-core processing unit 104 can be a distributed processing system that includes multiple interconnected processor cores. In general, the terms "processor" and "processor core" may be used interchangeably to describe discrete interconnected processing resources of the multi-core processing unit 104.

The system 100 also includes a process ID control unit 114 ("control unit 114"). The control unit 114 receives a set of ID headers and performs operations to dispatch the ID headers or to dispatch portions of information included in the ID headers. The ID headers are dispatched to channel controllers, which are described in more detail below with reference to FIG. 2. In some implementations, the system 100 includes multiple control units 114. For example, the system 100 can include a control unit 114 for each processor or processor core at the system 100. Each of the control units 114 that are coupled to a processor/core of the multi-core processing unit 104 receives a set of ID headers from a source. The source can be the host 102 or another processor of the multi-core processing unit 104.

An ID header can represent a request that includes information specifying addresses for memory locations in the memory 105. The memory 105 can represent a high-bandwidth memory (HBM) or an input/output (I/O) device that exchanges data communications with a control unit 114 in a processor core of an example hardware circuit included at system 100. For example, the memory 105 may exchange data communications with a processor core of the multi-core processing unit 104 to pass inputs to the core and to receive outputs generated by one or more computing resources of the core. The inputs and data values stored in, or written to, memory locations of memory 105 can represent vector elements or arrays of vector values.

The memory 105 can be dynamic random access memory (DRAM) assets of system 100. In some implementations, memory 105 is an external or off-chip memory relative to an example hardware circuit that includes one or more processors or processor cores. The memory 105 is configured to exchange data communications with on-chip resources of the hardware circuit, such as a vector processing unit (VPU) or vector memory banks of the VPU (described below). For example, memory 105 can be disposed at a physical location that is outside of an integrated circuit die that represents a hardware circuit of system 100. Hence, memory 105 can be distant or non-local relative to computing resources disposed within the integrated circuit die. Alternatively, memory 105, or portions of its resources, can be disposed within the integrated circuit die representing a special-purpose hardware circuit, such that the memory 105 is local to or co-located with computing resources of the circuit.

Figure 2:
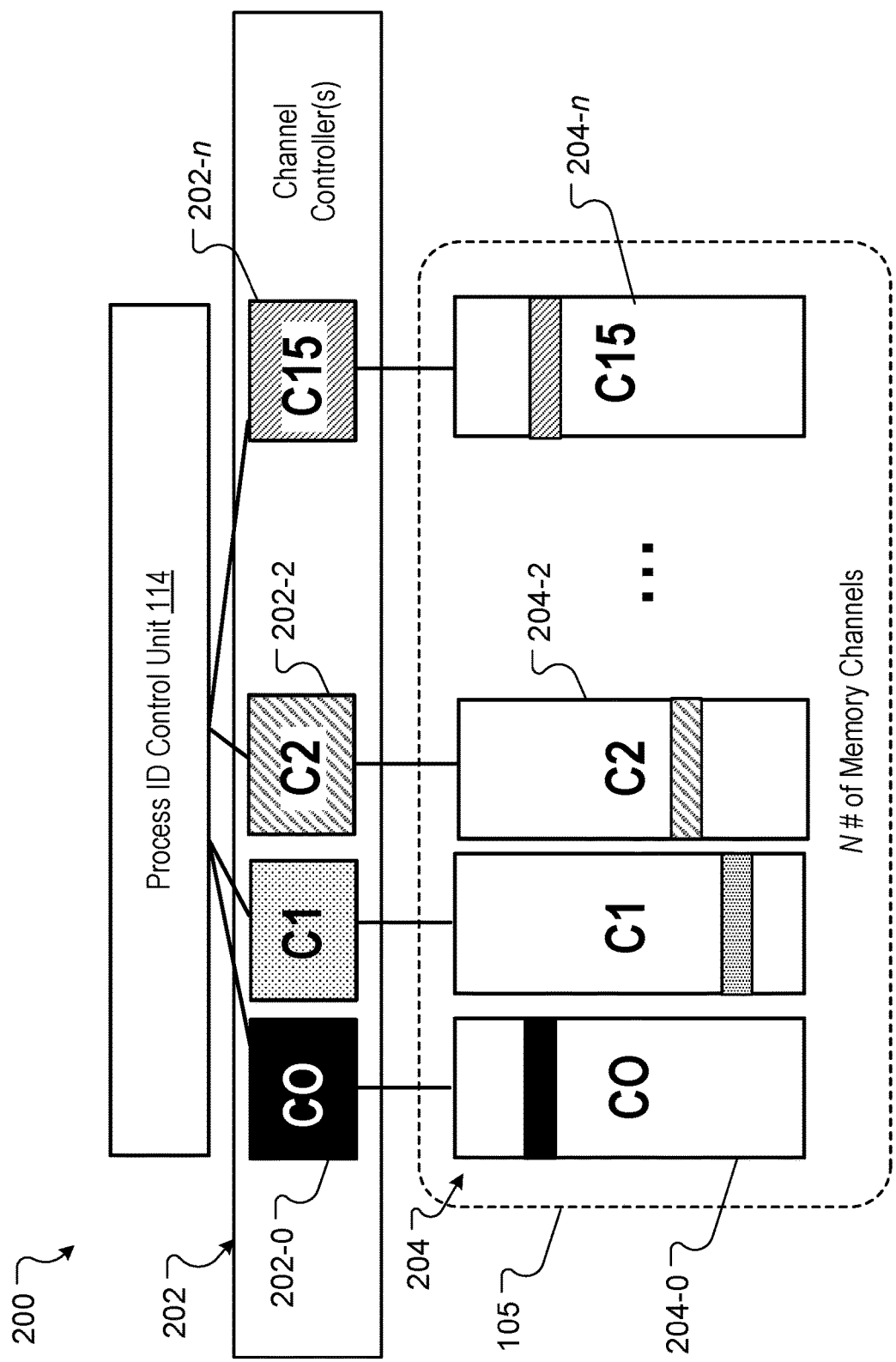
FIG. 2 is a block diagram of an architecture that includes examples of a control unit, channel controllers, and memory channels.

FIG. 2 is a block diagram of an architecture 200 that includes examples of channel controllers 202 and memory channels 204 of memory 105, as well as the control unit 114 described above. Each of the memory channels 204 can represent a memory bank of memory 105, a set of memory banks of memory 105, a set of memory locations of memory 105, or combinations of these.

A set of channel controllers 202 includes multiple respective channel controllers that are indicated at least as C0, C1, C2, and C15. In the example of FIG. 2 architecture 200 can include 16 channel controllers. In some implementations, architecture 200 includes more or few channel controllers. For example, the architecture 200 can include N number of channel controllers as well as N number of memory channels 204. These aspects of the architecture 200 are indicated by reference number 202-n, with respect to an individual channel controller, and by reference number 204-n, with respect to an individual memory channel.

The implementation of FIG. 2 shows an example where individual channel controllers, such as channel controllers 202-0 (C0) and 202-2 (C2), are hard mapped to specific corresponding memory channels, such as memory channels 204-0 (C0) and 204-2 (C2), respectively. As discussed above, a system memory 105 with channel controllers 202 that are hard mapped to specific memory channels can experience load imbalances. These load imbalances can stall or substantially delay operations for neural network computes performed at system 100, such as operations for generating an output for an embedding layer.

This prior approach of mapping specific channel controllers 202 to a particular memory channel can have other challenges. For example, the approach can have a constraint of requiring data be stored in a manner that is sensitive to how the addresses and data are mapped to specific channel controllers 202. Additionally, the approach can be inefficient when a system is required to perform a large number of randomized look ups to retrieve vectors from a large space in memory. To address these challenges, an on-chip interconnect (OCI), or crossbar, (described below) is integrated at a special-purpose hardware circuit. The crossbar may be integrated in a processing pipeline of the chip's circuitry to enable each channel controller to read data from, and write data to, any channel of a high-bandwidth memory system.

In some implementations, the special-purpose circuit is a multi-core hardware accelerator and the OCI is a channel controller interface that is uniquely configured at least based on the multi-core structure of the hardware accelerator. For example, the channel controller interface is configured to allow communication between each core of the multi-core hardware accelerator and each memory channel of memory 105, including different types of memory structures that correspond to the memory channels.

The channel controller interface can be sized to 32 B×4 instead of 128 B×1. Based on this example sizing, the channel controller interface can include multiple independent transaction threads between the memory 105 and channel controllers 202, without requiring extraneous ports for the OCI hardware. In some implementations, the channel controller interface is configured to efficiently handle dynamic bandwidth requirements at each channel and for different phases of compute. For example, the gigabyte per second (GBps) bandwidth requirements can vary for different computes for different access sizes, e.g., 32 Byte access, 64 Byte access, 128 Byte access. The phases can include forward pass compute, backward pass compute, and backward pass compute that implements optimization algorithms such as Adagrad to update learned values of a particular vector based on gradients produced from evaluating a neural network on some training data.

The channel controller interface can be uniquely configured to include multiple node interfaces. For example, the crossbar can include: i) an intra-client node interface operable to carry direct memory access (DMA) descriptors and control messages; ii) an intra-memory node interface operable to carry read/write commands and data for various memory structures of the memory system (e.g., buffer memory, instruction memory, shared memory, vector memory, host memory); iii) an intra-processor node interface (lower) that is operable to carry load/store traffic from a first/lower set of channel controllers 202 to the memory 105; and iv) an intra-processor node interface (upper) that is operable to carry load/store traffic from a second/upper set of channel controllers 202 to the memory 105.

As explained above, the OCI or channel controller interface is an implementation of a crossbar that allows sets of channel controllers to access any memory channel/address of memory 105. But, even when addresses specified in requests are spread among a set of channel controllers 202, the large scale execution of certain machine-learning workloads can exhibit data access patterns that result in a particular channel controller receiving a bulk of the data processing load relative to other channel controllers. In the example of FIG. 2, channel controller 202-0 demonstrates an imbalance in which that channel receives a bulk of the data processing load relative to other channel controllers (e.g., C1, C2). To address this challenge, the crossbar is used to implement a specific control scheme to control the allocations of addresses or requests to each channel controller 202. The control scheme causes addresses to be allocated substantially equally among the channel controllers 202. This is described in more detail below with reference to FIG. 3.

Figure 3:
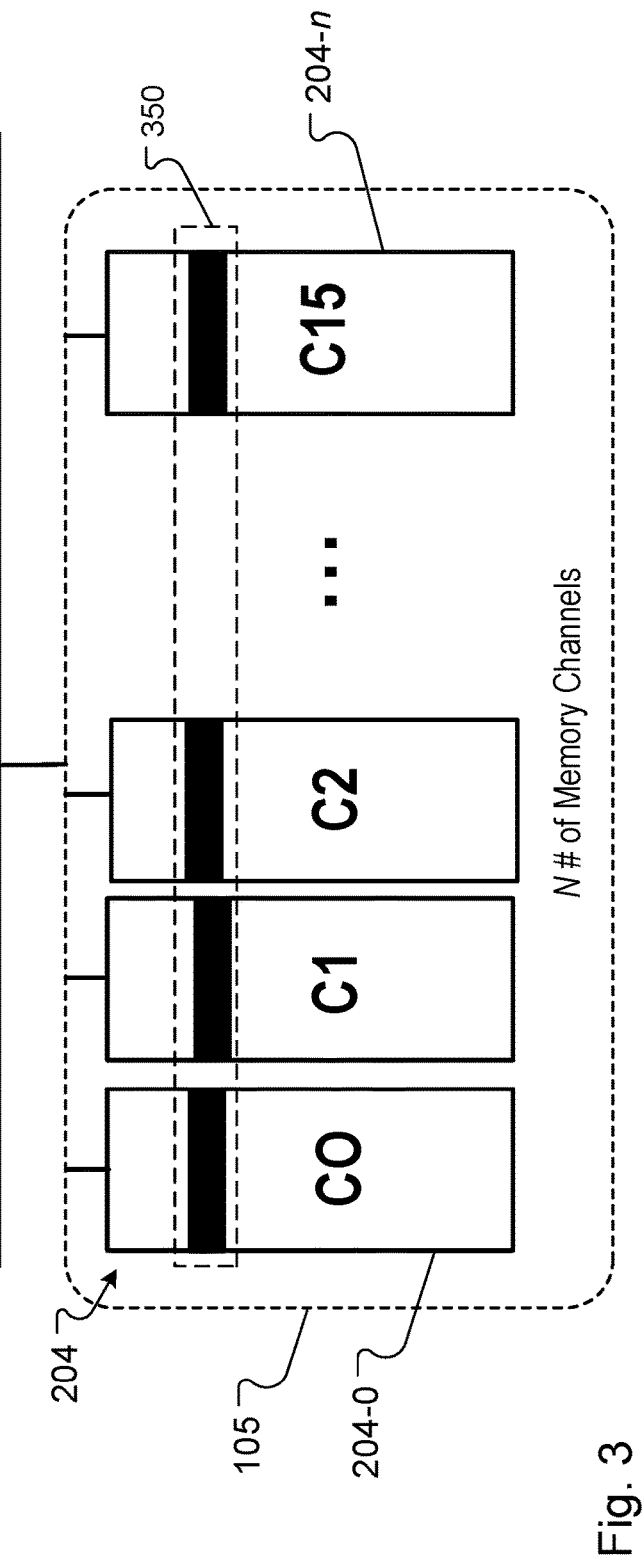
FIG. 3 illustrates an example algorithm used to implement load balancing for memory channel controllers.

FIG. 3 illustrates an example algorithm 300 used to implement load balancing for the memory channel controllers 202.

As indicated above, data accesses for an example machine-learning workload can exhibit certain pathological patterns. For example, even though a set requests and addresses may be spread generally across the channel controllers 202, certain patterns may be present in which a particular channel controller is required to operate on a substantial number of larger features or large vectors. Such patterns can cause the control unit 114 to dispatch a set of processing tasks or ID headers that still result in a load imbalance at the channel controllers 202. For example, the patterns may have a bursty property that cause them to appear for certain short time windows of processing, such as between 20 and 100 cycles. The load imbalance can occur even though any one of the channel controllers 202 is configured to access any memory location and any memory channel 204 of the memory 105.

The algorithm 300 corresponds to the control scheme noted above and is an example dispatch algorithm that is used to implement load balancing for the memory channel controllers 202 of system 100. The algorithm 300 can include pseudo-code as shown in the example of FIG. 3, which represents one or more of the instructional steps of the dispatch algorithm 300. In some implementations, the algorithm 300 is a modified round-robin dispatch algorithm. The modified round-robin attributes of the dispatch algorithm 300 allows a set of ID headers to be parsed and dispatched to the channel controllers 202.

For example, the modified round-robin dispatch algorithm 300 is configured to disrupt or inhibit latent pathological sequences that can occur during data accesses for a machine-learning workload. Because of this, the modified round-robin dispatch algorithm 300 is configured to allow allocations of ID headers (e.g., address of activations or gradients) in a manner that is load balanced across each channel controller 202 in a set of channel controllers (350). A standard round-robin approach for scheduling a process indicates to select a channel controller in a simple, circular order in which selections are performed without priority.

To address the bursty patterns discussed above, the round-robin approach can be adapted or modified to first detect an initial completion of a first circular order of selections. In response to detecting the initial completion, the control unit 114 can then adjust an increment parameter to modify the initial channel controller that is selected for a second or subsequent circular round of selections.

For example, the system 100 can include 16 channel controllers (e.g., CC0-CC15). The control unit 114 can select each channel controller 202 during an initial round and detect completion of the initial round based on a count parameter that indicates CC15 has been selected during that round. The count parameter can correspond to the total number of channel controllers (16) such that selection of CC15 during the initial round indicates selection of each of the 16 channel controllers. The control unit 114 can then adjust the value of an increment parameter to bypass selection of a particular channel controller.

For example, the control unit 114 can increase the increment parameter to bypass selection of CC0 and select CC1 at the start of a subsequent round of channel selections. Likewise, the control unit 114 can again increase the increment parameter to bypass selection of CC1 and select CC2 at the start of another subsequent round of channel selections. In some implementations, the control unit 114 can periodically adjust the value of the increment parameter to increase (or decrease) an increment of the channel count based on one or more observed data access patterns, as described in more detail below with reference to FIG. 4.

FIG. 4 illustrates a table 400 that shows an example sequence 410 for selecting channel controllers 202 to effect a balanced allocation of requests to different channel controllers 202.

As described briefly above, a native round-robin scheme can suffer from pathological patterns in input data being accessed for a computation. For example, a pattern can be that every 16th ID header will belong to an embedding table that has the longest embedding vectors and most compute intensive optimizer. The example pattern can cause load imbalance even in the native round-robin scheme. The control unit 114 can be a hardware component of a processor core that executes instructions corresponding to the dispatch algorithm 300 to implement a modified round-robin ID header dispatch scheme.

Based on the algorithm 300, this dispatch scheme is operable to reduce a probability of load imbalance due to pathological patterns in a set of input data. The algorithm 300 can be used to generate the example sequence 410 for selecting channel controllers 202. Each number in the sequence indicates a channel controller to be selected. In some implementations, the sequence 410 can initially iterate through each channel controller in a set (e.g., 0 through 15) based on an initial unmodified round-robin flow.

After an initial iteration in which each channel controller is selected, the round-robin flow can be modified to select channel controller CC1 rather than beginning again with selection of channel controller CC0. Likewise, after a second iteration in which each channel controller is selected, the round-robin flow can be modified to select channel controller CC2 rather than beginning again with selection of channel controller CC1. This modified selection scheme provides an example of how each channel controller in a set can be selected by the control unit 114 to allow for equal, or substantially equal, distribution of addresses among the set. In some implementations, the system 100 monitors data access patterns for each channel controller and dynamically adjusts or modifies the dispatch schemes based on the observed patterns.

The control unit 114 uses the modified dispatch schemes to generate a set of channel numbers for a set of channel controllers 202. The generated set of channel numbers are processed at the control unit 114 to forward ID headers to corresponding channel controllers 204. In some implementations, the control unit 114 forwards the ID headers to corresponding channel controllers 204 based on the example sequence 410, which is derived from the modified dispatch scheme. To ensure sufficient load-balancing of processing workloads for ID headers across the channel controllers 202, the algorithm 300 causes the control unit 114 to implement certain properties for selection of the channel numbers. In some implementations, algorithm 300 is used for channel selection based on the example steps of the pseudo-code shown at FIG. 3.

For example, the channel selection properties requires that generation of the channel numbers be fair and non-bursty. The "fair" property for generating the channel numbers causes (or requires) all channel controllers to be selected equally or substantially equally for a given machine-learning task. The "non-bursty" property for generating the channel numbers causes (or requires) the channel controllers to be selected without intermittent increases in repeated selection of a particular channel controller for a given machine-learning task. For example, a channel number sequence of "0, 1, 0, 1, 4, 5, 0, . . . " is not a desirable pattern and would not satisfy the "non-bursty" property for generating the channel numbers.

An example set of metrics can be used to determine whether each of the above properties (e.g., fair and non-bursty) are satisfied. The metrics include determining a count, a mean (average), and a median with respect to the number of times a channel number appears for selection. For the "count" metric, the system 100 is operable to determine a count of the number of times a channel or channel number is included per processing iteration. The number of times should be the same for all the channels 202 or channel controllers 202. If the system 100 determines that the number of times is not the same, the system 100 can detect that a particular pattern of channel controller selection is biased and not load-balanced for a given set of operations.

For the "mean" metric, the system 100 is operable to determine, for each channel number, whether the number of times a channel number appears for selection converges to N after a threshold number of iterations, where Nis an integer greater than or equal to one. For example, if the system 100 includes 16 channel controllers, then the system 100 is operable to determine, for each channel number, whether the number of times a channel number appears for selection converges to 16 after a threshold number of iterations or ID headers. In some implementations, the threshold number of iterations varies based on the size and complexity of the data being retrieved and operated on.

The "median" metric indicates a burstiness of a particular channel controller. For example, if the system 100 determines that a channel controller 204-n has a low median selection value then it will receive more ID headers in a burst relative to other channel controllers, which can indicate an imbalance. The table 400 includes sample metric values for each channel number for an example processing iteration that was run for a threshold 2048 ID headers. As noted earlier, the system 100 can monitor data access patterns for each channel controller, relative to the metrics and properties discussed above, and dynamically adjust or modify the dispatch/control schemes based on the observed patterns. For example, the control unit 114 can periodically adjust the value of the increment parameter to increase (or decrease) an increment of the channel count based on the data access patterns.

Figure 5:
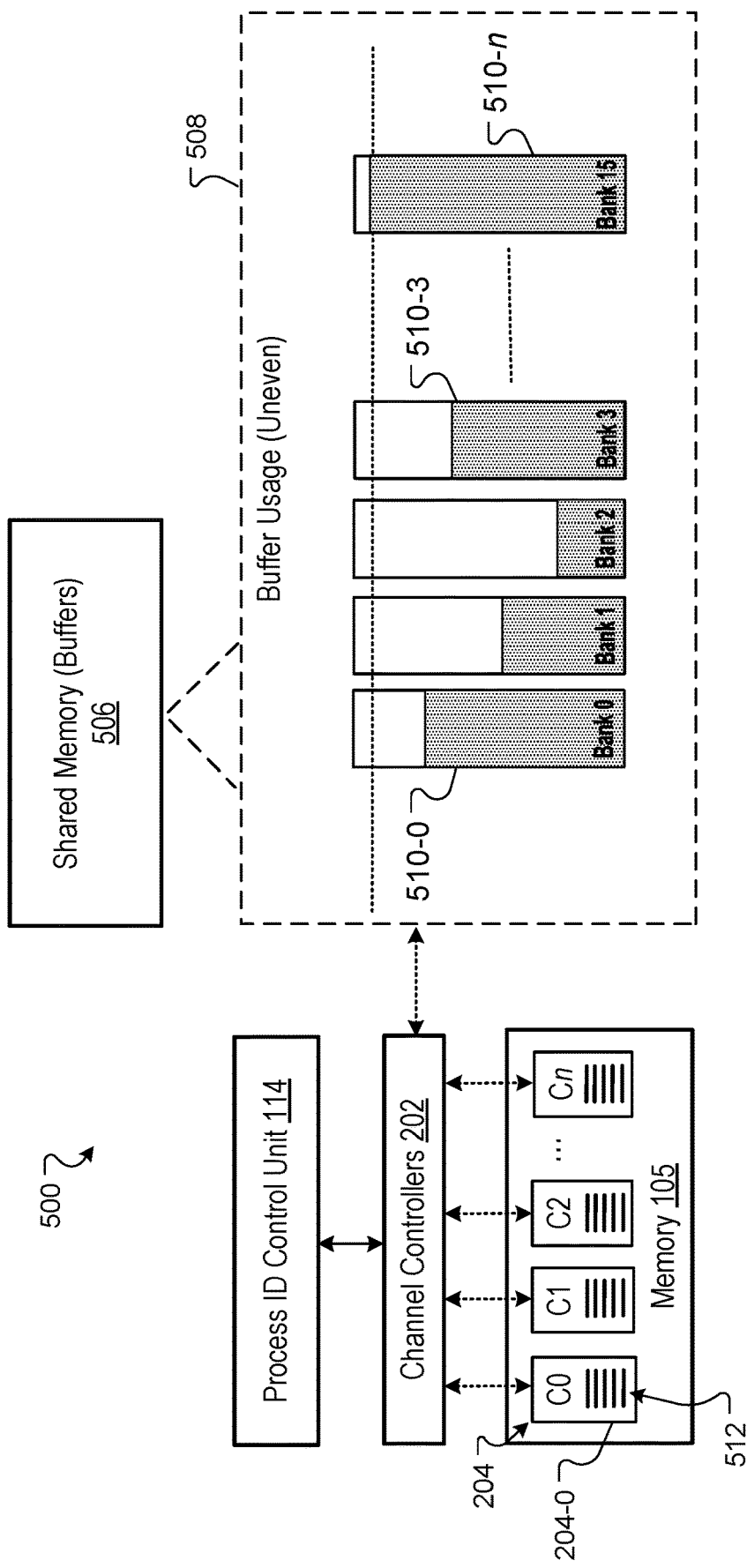
FIG. 5 is a block diagram of an architecture that includes examples of a processor core and shared memory buffers of the system of FIG. 1.

FIG. 5 is a block diagram of an architecture 500 of the system 100 and includes examples of a shared scratchpad memory 506 ("shared memory 506") and one or more shared buffers 508 of the shared memory 506. The shared memory 506 is a software managed memory unit that is globally shared across all memory channels 204 of the system 100. More specifically, each channel controller 202 is configured to share the scratchpad buffer space of shared memory 506 represented by shared buffers 508.

In the example of FIG. 5, the shared buffers 508 include respective memory banks, such as memory banks 510-0, 510-3, and 510-n. Each memory bank 510 can be configured as a circular buffer and the architecture 500 can include N circular buffers, where Nis an integer greater than or equal to one. Hence, each bank 508 may be referred to alternatively as a circular buffer 508. Each circular buffer 508 is used with an allocation scheme that does not depend on a size and/or order of data that is written to the buffer. For example, prior approaches that depend on the size/order of data flow to this shared space to allocate buffer space to channel controllers 202 can result in wasteful over allocation of buffer space when large portions of allocated space are unused by the channel controller to which the space is assigned.

This wasteful over allocation creates a memory imbalance issue at system 100. In the example of FIG. 5, the order and size of data flow to buffer 510-n (e.g., for a certain channel controller 202) triggers a large buffer space allocation requirement relative to other buffers 510, such as buffers corresponding to bank 1 and bank 2. In prior approaches, the buffer space allocated at buffer 510-n would drive the size allocations for other individual buffers 510 and trigger an imbalance that results in over allocation. The substantially uneven buffer usage shown at FIG. 5 can also limit the batch sizes that can be processed for a given workload.

Figure 6:
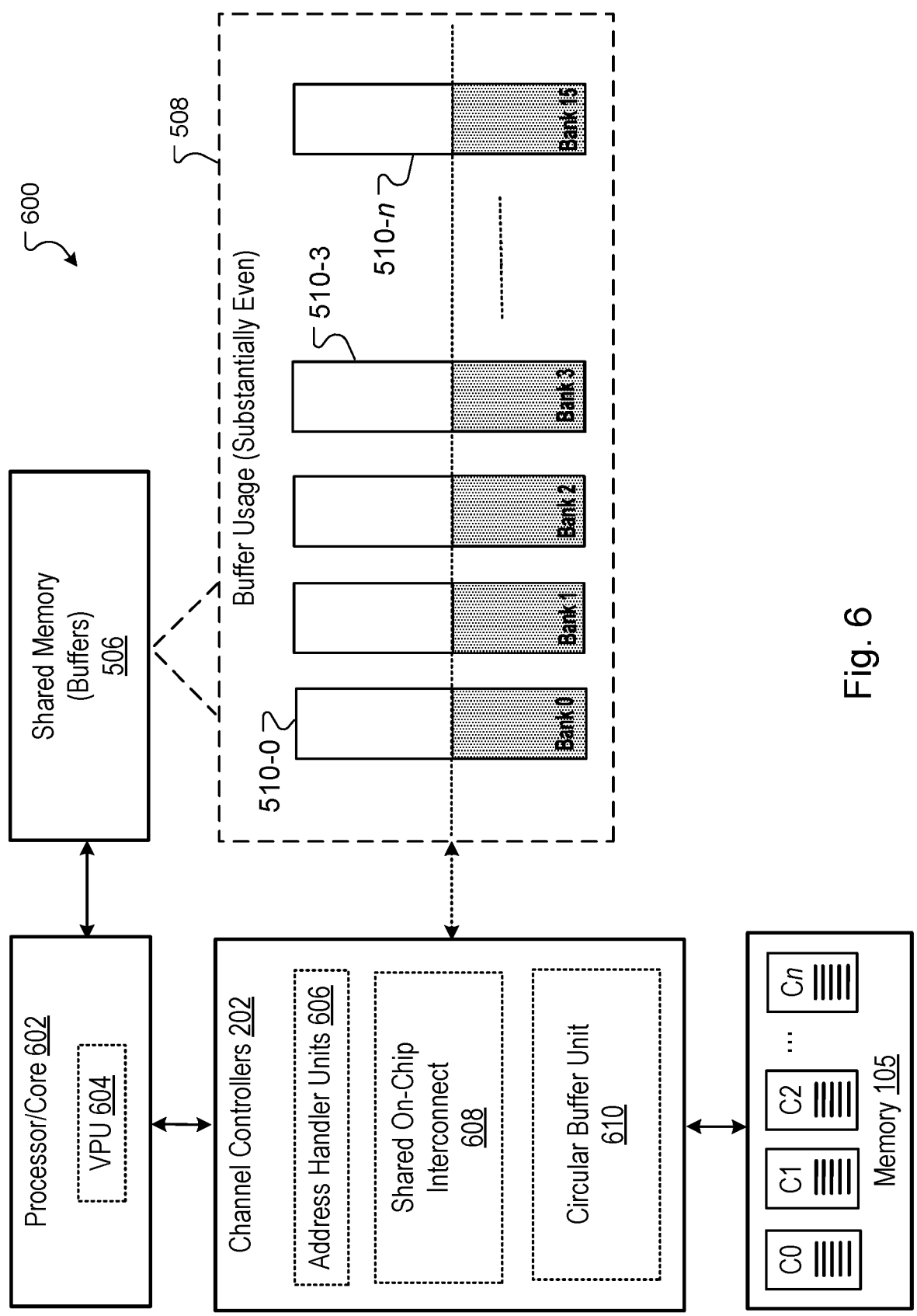
FIG. 6 shows example components of a channel controller that are used to allocate resources of a shared memory buffers.

FIG. 6 is a block diagram of an architecture 600 of the system 100. The architecture 600 includes examples of a processor core 602, a vector processing unit 604 ("VPU 604"), and components of a respective channel controller 202. One or more of the components of the channel controller 202 can be used to allocate resources of shared memory buffers 508. The components of the channel controllers 202 include an address handler unit 606, a shared on-chip interconnect 608 ("shared interconnect 608"), and a circular buffer unit 610.

The components of the channel controller 202 can represent an example processing pipeline of the channel controller 202. The address handler unit 606 generates a "deallocate" signal whenever channel ID data processing is completed. The channel ID data corresponds to a descriptor generated control unit 114 for processing by a channel controller 202 and is described below. The address handler unit 606 can correspond to the VPU 604 can be used to perform arithmetic and computational operations generally associated with an example vector processor. In some implementations, the processing pipeline of a channel controller 202 is used to perform backward pass and forward pass operations with respect to an embedding layer of a neural network. The deallocate signal as well as backward pass and forward pass operations are described below.

The shared interconnect 608 is a crossbar device that is operable to allow any channel controller 202 to communicate with any one of the memory channels 204 on a chip or hardware circuit of system 100. For example, shared interconnect 608 can represent an on-chip interconnect (OCI) interface. As indicated above, the shared interconnect 608 can be referred to alternatively as an OCI interface, a channel controller interface, or a crossbar. In some implementations, the channel controllers 202 are connected to example HBM channels of memory 105 through this OCI interface. The OCI interface allows any channel controller 202 to talk to any HBM channel within a special-purpose chip, hardware circuit, or hardware accelerator. In some examples, the shared interconnect 608 allows each of the channel controllers 202 to read data from, and write data to, any address location for any channel in memory 105. The shared interconnect 608 provides a type of load-balancing that allows the system 100 to allocate requests to individual channel controllers 202 for processing across all memory channels 204.

The circular buffer unit 610 is responsible for managing each allocated buffer 510. The circular buffer unit 610 is configured to keep track of a head, tail, and the empty status of the buffer 510 (e.g., a circular buffer). In some implementations, an execution thread of a channel controller 202 can be stalled if the circular buffer unit 610 determines that a shared circular buffer 510 that was assigned to a selected channel controller 202 does not have enough space to store data corresponding to a request to be processed using the channel controller 202.

As described above, each of the control units 114 that are coupled to a processor/core 602 of the multi-core processing unit 104 receives a set of ID headers from a source. Each of these control units 114 is operable to perform operations related to parsing ID headers received from the host 102 or from other processor cores in the system 100. For example, during a forward pass operation for an embedding layer of a neural network, the control unit 114 can parse the ID headers received from other processor cores (or from the host 102) and dispatch the ID headers belonging to a same sample and feature to one of the channel controllers 202. In some implementations, each control unit 114 is operable to generate and dispatch a descriptor ("a request") corresponding to an ID header. The request includes addressing and buffer information to be processed by a channel controller to retrieve a sample and feature value from locations of a channel in memory 105.

During an example backward pass operation for the embedding layer, the control unit 114 can parse a tuple of {Addresses, Gradient Vectors} received from other processor cores (or from the host 102). The system 100 can perform this function to update embedding vectors with a corresponding gradient vector. The control unit 114 dispatches the addresses to any one of the channel controllers 202. For example, the control unit 114 can dispatch, to channel controller 202-2, an address for an embedding vector stored at a location of memory channel 204-0. The control unit 114 can dispatch the address after copying the corresponding gradient vector into a bank (or buffer) of the shared memory 506 that is mapped to the selected channel controller 202-2. In some implementations, the system 100 causes the buffer address of the gradient vector to be stored in the address for the embedding vector before the address for the embedding vector is forwarded to the selected channel controller.

Referring again to FIG. 6, as discussed above the amount of buffer space for shared memory 506 that is used by each channel controller 202 can be very different and can lead to underutilization of the scratchpad memory buffers 508. The underutilization results in lower batch sizes that can be processed for a given workload, leading to degraded or lower performance at system 100. To resolve the memory imbalance and improve the efficiency and utilization of the shared buffers, the system 100 is configured to allocate space in the circular buffers 510 based at least on a latency of the memory accesses observed in an example processing pipeline of each channel controller.

In other words, the memory imbalance issue can be solved by implementing one or more software-configured, hardware-managed circular buffers 510 in the scratchpad memory 506. A sizing of the circular buffers 510 is independent of the number of addresses that are processed by a selected channel controller 202. Instead, the sizing of the circular buffers 510 is a function of overall latency of the compute pipeline.

Figure 7:
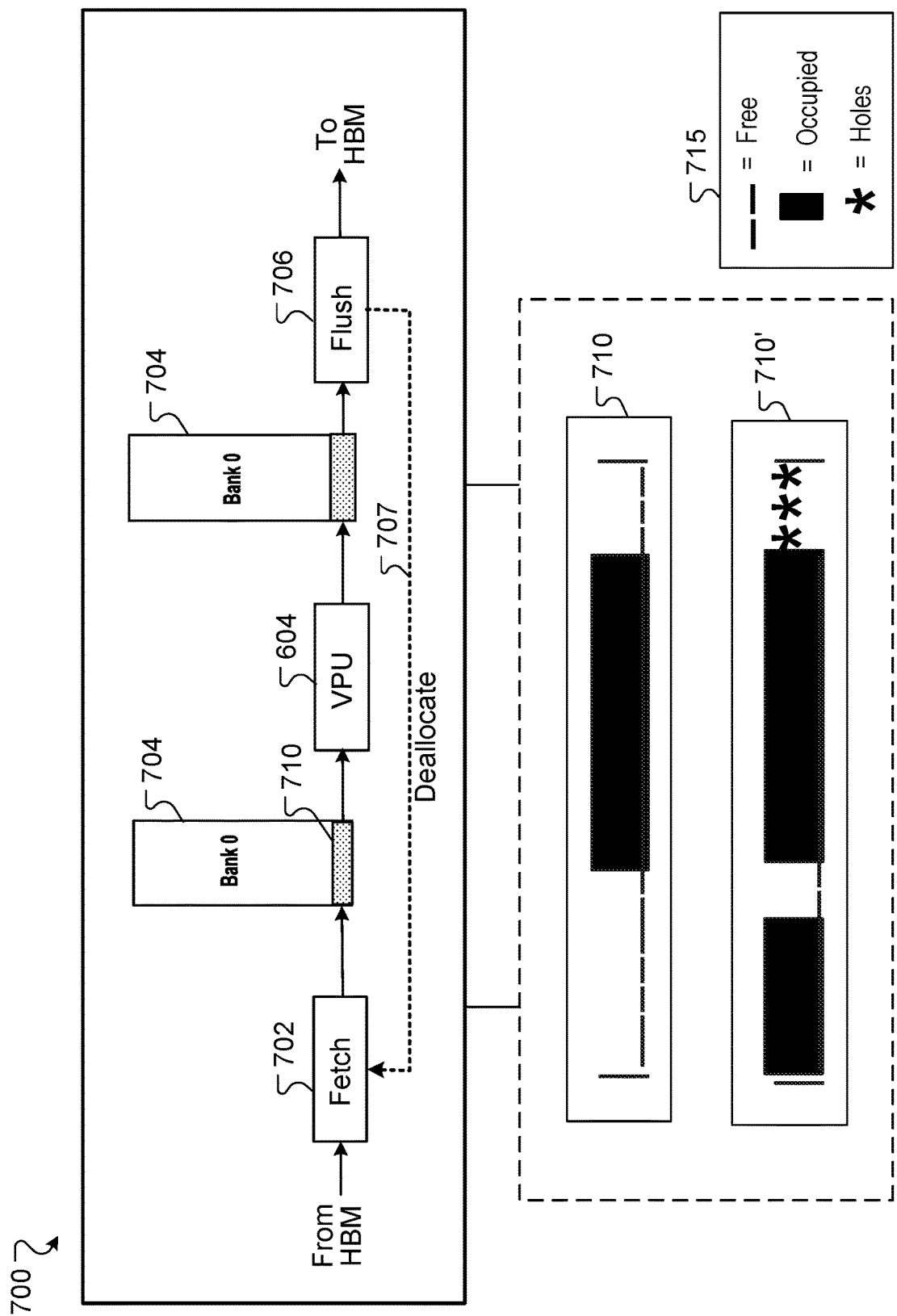
FIG. 7 is a block diagram of an example circular buffer, including status information of an individual buffer.

FIG. 7 is a block diagram of an example circular buffer architecture 700, including status information of an individual buffer. Each of the selected channel controllers 202, including its circular buffer unit 610, is operable to determine an allocation of shared resources in the shared memory 506. The selected channel controller 202 performs example neural network computations based on the determined allocation of shared resources. The shared resource can be a memory bank/buffer 704 of shared memory 506 that is configured as a circular buffer of the shared memory and that communicates with an example vector processor of processor 604.

The circular buffer unit 610 can determine an allocation of shared resources in the shared memory 506 by determining an amount of scratchpad buffer space to be used by the selected channel controller 202 and a VPU 604 of a processor 602 that performs a portion of the neural network computations. For example, the allocation of shared resources is determined based on latency of memory accesses observed in an example processing pipeline of each channel controller 202. Based on the determined allocation, a set of gradient vectors may be copied into an allocated space of buffer/bank 704 and operated on using the VPU 604, or the address handler unit 606 described above. In some implementations, the shared buffer space may be a recently deallocated entry in a buffer/bank 704 of shared memory 506.

In example dispatch thread executed by the control unit 114, the control unit 114 selects a channel controller 202 to receive channel ID data and uses allocated circular buffer space to store activation gradients in the memory bank 704 assigned to the selected channel controller 202. If the selected channel controller 202 does not have enough space in the circular buffer/bank 704 the control unit 114 can stall the dispatch thread until a sufficient amount of space can be allocated for the selected channel controller 202.

A "deallocate" signal 707 is generated and sent to control unit 114 during a backward pass operation for activation gradients and to an example fetch ID unit 702 during a forward pass operation for parameters. The deallocate signal 707 is generated by a flush ID unit 706 of the address handler unit 606 whenever channel ID data processing is completed for a given dispatch thread. In general, the deallocate signal 707 is used to deallocate a portion of buffer memory 704 that was previously used by a channel controller 202 (or VPU 604) to operate on a piece of data when the data for the operation is flushed from an entry in the buffer 704. For example, the deallocate signal 707 can be generated and sent to the control unit 114 or fetch ID unit 702 to indicate that a portion of data (e.g., activation gradients or parameters) has been flushed from a circular buffer 704.

Each channel controller 202 stores its intermediate values in the software defined circular buffers 704 in the shared memory 506. A set of instructions, such as finite state machine (FSM) instructions, can be used to define a buffer_offset and a buffer_size for the circular buffers 704 used during their execution. For example, if a buffer 704 is partially filled, and additional allocation is requested, but that allocation would go beyond the end of the buffer region, a new allocation is generated starting at the buffer_offset. This new allocation leaves a hole behind at the end of the buffer region.

As an example, if a length-20 buffer was in a state where 10 units were allocated, with a tail pointer at position_7, and a head pointer at position_16 (710), and an additional allocation request attempts to allocate a length-5 space, that space would be allocated as shown at feature 710' in the example of FIG. 7. To ensure the holes are deallocated properly, the allocation shown at feature 710' should be recorded as a length-8 allocation. In the example of FIG. 7, a map 715 is shown for clarity, but is not included in the system 100. For example, the map 715 indicates that "_" represents a free space in the buffer that used for an allocation request, "■" represents an occupied space in the buffer, and "*" represents the holes.

Figure 8:
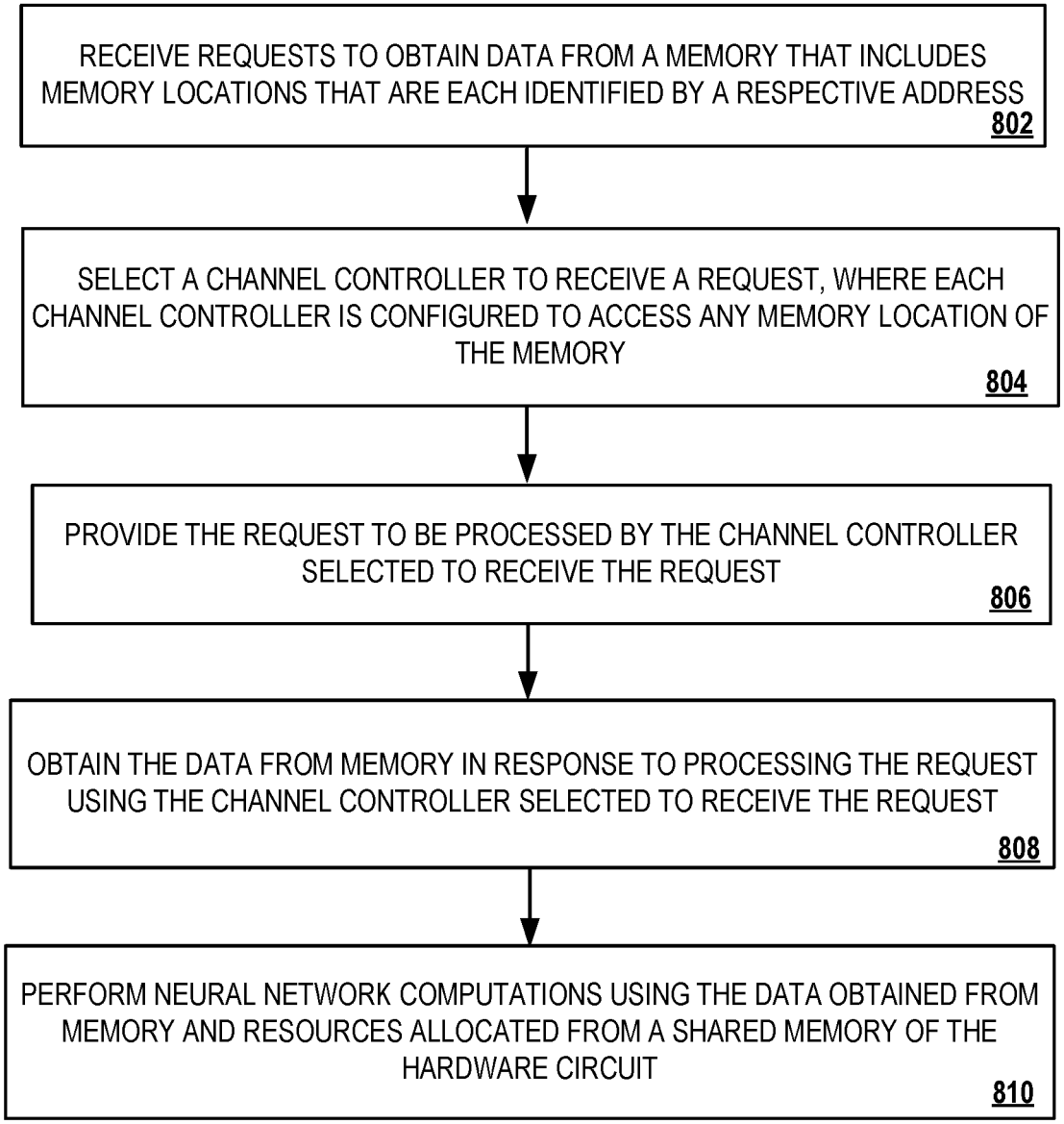
FIG. 8 is a flow diagram of an example process for load balancing requests handled by a set of memory channel controllers.

FIG. 8 is a flow diagram of an example process 800 that is used to load balance requests handled by a set of memory channel controllers. Process 800 can be implemented or executed using the system 100 described above. Descriptions of process 800 may reference the above-mentioned computing resources of system 100. In some implementations, steps or actions of process 800 are enabled by programmed firmware or software instructions, which are executable by one or more processors of the devices and resources described in this document. In some implementations, the steps of process 500 correspond to a method for performing computations to generate an output for a neural network layer using a hardware circuit configured to implement the neural network.

Referring now to process 800 a component of system 100 receives requests to obtain data from a memory that includes memory locations, where each memory location is identified by a respective address (802). For example, the data may be data for neural network layer that is stored across HBM channels of memory 105. In some implementations, the data is a vector of numerical values for an example neural network layer. An embedding layer can be represented by a trainable lookup table that maps features in a large feature space, e.g., words in an online Ad, to vectors of numbers. For example, the neural network layer is an embedding layer that is represented by a trainable lookup table that maps each feature in the set of features to a respective vector of numbers.

For each request to obtain the data from the memory, a channel controller is selected to receive the request (804). For example, the control unit 114 selects a particular channel controller 202 to receive the request, where each channel controller 202 that is selected by the control unit 114 is configured to access any memory location of any channel 204 of the memory 105. In some implementations, each channel controller 202 is connected to example HBM channels of memory 105 through can OCI interface, which is configured to allow any of the channel controllers 202 to perform compute on an embedding vector stored anywhere in an HBM channel 204 of the memory 105.

For each request to obtain the data from the memory, the request is provided to be processed by the channel controller 202 selected to receive the request (806). For example, the request can correspond to an ID header received at the control unit 114. The control unit 114 generates a descriptor in response to parsing memory location addresses and buffer information from the ID header and provides the request as a descriptor to be processed by the selected channel controller 202. For each request to obtain the data from the memory, the channel controller obtains the data from the system memory in response to processing the request using the control unit 114 as well as the channel controller 202 selected to receive the request (808).

The channel controllers 202 perform neural network computations using the data obtained from memory 105 and resources of buffer 510 that are allocated from a shared memory 506 of the hardware circuit (810). For cases such as words in an Ad, there may be several vectors to be looked up or retrieved from memory 105 that are then added together or perhaps multiplied by a set of weights (parameters) first. The addition and multiplication operations can represent a portion of the neural network computations that are performed using the obtained data and buffer 510.

In some cases, efficient implementation embeddings of an embedding table requires that system 100 be able to quickly look up a large number of vectors randomly from a large space in memory 105. Using the techniques described in this document, the embedding table can be sharded in any manner, for example, in any row and column dimension and stored in any channel of memory 105 yet still be accessible by any processor 602 among multiple processors 602 and channel controllers 202 that form the multi-core processing unit 104.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus.

Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "computing system" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. Some elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for performing neural network computations using a system configured to implement a neural network on a hardware circuit, the method comprising:
    receiving a request to obtain data for performing neural network computations from a memory comprising a plurality of memory channels, each memory channel comprising a plurality of memory locations, wherein the data is distributed across the plurality of memory locations of the plurality of memory channels, wherein the data comprises a respective vector of numbers mapped to, by an embedding neural network layer of the neural network, a respective vocabulary feature in a set of vocabulary features;
    selecting channel controllers from a plurality of channel controllers to fetch at least a portion of the data associated with the request, wherein each channel controller is configured to access: i) each memory channel of the plurality of memory channels and ii) each memory location of the plurality of memory locations that is included in each memory channel of the plurality of memory channels, wherein each of the channel controllers is selected based on a dispatch algorithm configured to periodically adjust a value of an increment parameter in the dispatch algorithm to bypass a selection of a particular channel controller so that a load imbalance of the channel controllers is reduced when obtaining the data associated with the request;
    processing the request, using the selected channel controllers, by accessing a respective plurality of memory locations for a memory channel of the plurality of memory channels to obtain the data associated with the request for performing neural network computations; and
    obtaining the data, by the selected channel controllers, from the memory in response to processing the request; and performing the neural network computations using the data obtained from memory and resources allocated from a shared memory of the hardware circuit.

2. The method of claim 1, wherein
the dispatch algorithm is used to distribute respective addresses of memory locations to any one of the plurality of channel controllers that is selected to receive a request.

3. The method of claim 2, further comprising:
receiving a plurality of requests to obtain different inputs from the memory, each request of the plurality of requests specifying an address for a memory location that stores a corresponding input;
determining, based on the dispatch algorithm, an allocation of addresses corresponding to each of the plurality of requests; and
distributing the plurality of requests to the plurality of channel controllers based on the determined allocation of addresses.

4. The method of claim 3, wherein determining the allocation of addresses comprises:
determining the allocation of addresses such that a respective quantity of addresses that is allocated and distributed to a corresponding channel controller is the same among each of the plurality of channel controllers.

5. The method of claim 2, wherein the system comprises a shared on-chip interconnect that is configured to allow any channel controller to access memory locations allocated to any memory channel of the plurality of memory channels in the memory.

6. The method of claim 5, wherein the method comprises:
accessing, based on the shared on-chip interconnect, any memory location allocated to any memory channel using any channel controller.

7. The method of claim 1, wherein performing the neural network computations comprises:
determining an allocation of shared resources in the shared memory; and
performing the neural network computations based on the determined allocation of shared resources.

8. The method of claim 7, wherein determining an allocation of shared resources in the shared memory comprises:
determining an amount of scratchpad memory to be used by a selected channel controller and a vector processing unit of the system that performs a portion of the neural network computations.

9. The method of claim 8, wherein a shared resource of the shared memory is a memory bank of the shared memory that is configured as a circular buffer of the shared memory that communicates with the vector processing unit.

10. The method of claim 1, further comprising:
generating an embedding output of the embedding neural network layer using the data obtained from memory in response to processing the request and wherein performing neural network computations comprises providing the embedding output as input to another neural network layer.

11. The method of claim 10, wherein the embedding neural network layer is represented by a trainable lookup table that maps each vocabulary feature in the set of vocabulary features to a respective vector of numbers, wherein each vocabulary feature in the set of vocabulary features is assigned to a respective one-hot vector configured to index a respective vector of numbers in the trainable lookup table mapped to the vocabulary feature.

12. The method of claim 11, further comprising:
updating embeddings stored at the trainable lookup table for the embedding neural network layer of the neural network based on performing the neural network computations.

13. The method of claim 12, wherein:
updating the embeddings comprises updating values of the trainable lookup table in response to back propagating gradients that are computed based on the embedding output as part of performing the neural network computations.

14. A system configured to implement a neural network on a hardware circuit to perform neural network computations, the system comprising:
one or more processing devices; and
one or more non-transitory machine-readable storage devices for storing instructions that are executable by the one or more processing devices to cause performance of operations comprising:
receiving a request to obtain data for performing neural network computations from a memory comprising a plurality of memory channels, each memory channel comprising a plurality of memory locations, wherein the data is distributed across the plurality of memory locations of the plurality of memory channels, wherein the data comprises a respective vector of numbers mapped to, by an embedding neural network layer of the neural network, a respective vocabulary feature in a set of vocabulary features;
selecting channel controllers from a plurality of channel controllers to fetch at least a portion of the data associated with the request, wherein each channel controller is configured to access: i) each memory channel of the plurality of memory channels and ii) each memory location of the plurality of memory locations that is included in each memory channel of the plurality of memory channels, wherein each of the channel controllers is selected based on a dispatch algorithm configured to periodically adjust a value of an increment parameter in the dispatch algorithm to bypass a selection of a particular channel controller so that a load imbalance of the channel controllers is reduced when obtaining the data associated with the request;
processing the request, using the selected channel controllers, by accessing a respective plurality of memory locations for a memory channel of the plurality of memory channels using the selected channel controllers to obtain the data associated with the request for performing neural network computations; and
obtaining the data, by the selected channel controllers, from the memory in response to processing the request; and
performing the neural network computations using the data obtained from memory and resources allocated from a shared memory of the hardware circuit.

15. The system of claim 14, wherein
the dispatch algorithm is used to distribute respective addresses of memory locations to any one of the plurality of channel controllers that is selected to receive a request.

16. The system of claim 15, wherein the operations further comprise:
receiving a plurality of requests to obtain different inputs from the memory, each request of the plurality of requests specifying an address for a memory location that stores a corresponding input;

determining, based on the dispatch algorithm, an allocation of addresses corresponding to each of the plurality of requests; and distributing the plurality of requests to the plurality of channel controllers based on the determined allocation of addresses.

17. The system of claim 16, wherein determining the allocation of addresses comprises:

determining the allocation of addresses such that a respective quantity of addresses that is allocated and distributed to a corresponding channel controller is the same among each of the plurality of channel controllers.

18. The system of claim 15, wherein the system comprises a shared on-chip interconnect that is configured to allow any channel controller to access memory locations allocated to any memory channel of the plurality of memory channels in the memory.

19. The system of claim 18, wherein the operations further comprise:

accessing, based on the shared on-chip interconnect, any memory location allocated to any memory channel using any channel controller.

20. The system of claim 14, wherein performing the neural network computations comprises:

determining an allocation of shared resources in the shared memory; and performing the neural network computations based on the determined allocation of shared resources.

21. The system of claim 20, wherein determining an allocation of shared resources in the shared memory comprises:

determining an amount of scratchpad memory to be used by a selected channel controller and a vector processing unit of the system that performs a portion of the neural network computations.

22. The system of claim 21, wherein a shared resource of the shared memory is a memory bank of the shared memory that is configured as a circular buffer of the shared memory that communicates with the vector processing unit.

23. The system of claim 14, wherein the operations further comprise:

generating an embedding output of the embedding neural network layer using the data obtained from memory in response to processing the request; and wherein performing neural network computations comprises providing the embedding output as input to another neural network layer.

24. The system of claim 23, wherein the embedding neural network layer is represented by a trainable lookup table that maps each vocabulary feature in the set of vocabulary features to a respective vector of numbers, wherein each vocabulary feature in the set of vocabulary features is assigned to a respective one-hot vector configured to index a respective vector of numbers in the trainable lookup table mapped to the vocabulary feature.

25. The system of claim 24, wherein the operations further comprise:

updating embeddings stored at the trainable lookup table for the embedding neural network layer of the neural network based on performing the neural network computations.

26. The system of claim 25, wherein:

updating the embeddings comprises updating values of the trainable lookup table in response to back propagating gradients that are computed based on the embedding output as part of performing the neural network computations.

27. One or more non-transitory machine-readable storage devices for implementing a neural network on a hardware circuit to perform neural network computations and for storing instructions that are executable by one or more processing devices to cause performance of operations comprising:

receiving a request to obtain data for performing neural network computations from a memory comprising a plurality of memory channels, each memory channel comprising a plurality of memory locations, wherein each of the channel controllers is selected based on a dispatch algorithm configured to periodically adjust a value of an increment parameter in the dispatch algorithm to bypass a selection of a particular channel controller so that the load imbalance of the channel controllers is reduced when obtaining the data associated with the request;

selecting channel controllers from a plurality of channel controllers to fetch at least a portion of the data associated with the request, wherein each channel controller is configured to access: i) each memory channel of the plurality of memory channels and ii) each memory location of the plurality of memory locations that is included in each memory channel of the plurality of memory channels, wherein each of the channel controllers is selected based on a dispatch algorithm configured to periodically adjust a value of an increment parameter in the dispatch algorithm to bypass a selection of a particular channel controller to reduce load imbalance of the channel controllers to obtain the data associated with the request;

processing the request, using the selected channel controllers, by accessing a respective plurality of memory locations for a memory channel of the plurality of memory channels to obtain the data associated with the request for performing neural network computations; and obtaining the data, by the selected channel controllers, from the memory in response to processing the request; and performing the neural network computations using the data obtained from memory and resources allocated from a shared memory of the hardware circuit.

* * * * *